United States Patent Office 3,372,100
Patented Mar. 5, 1968

3,372,100
PROCESS FOR IMPROVING THE PROPERTIES OF A POLYMER BY CROSS-LINKING IN THE PRESENCE OF RADIATION
Arthur Charlesby, Shrivenham, Swindon, Wilts, and Solomon H. Pinner, Lexden, Colchester, England, assignors to Raychem Corporation, Redwood City, Calif., a corporation of California
No Drawing. Continuation-in-part of application Ser. No. 639,218, Feb. 11, 1957. This application Feb. 11, 1963, Ser. No. 257,739
Claims priority, application Great Britain, Feb. 14, 1956, 4,587/56
2 Claims. (Cl. 204—159.17)

This application is a continuation-in-part of our co-pending application Ser. No. 639,218, filed Feb. 11, 1957.

This invention is concerned with the use of high energy ionising radiation such as high energy electrons, X-rays or gamma rays to improve the qualities of polymeric materials. It is known that the effect of such radiations can be used not only to induce polymerisation of monomers but also to produce cross-linking in polymers, including polyethylene and polystyrene. It is an advantage of irradiation that it can be applied to solid articles in a fabricated form so that the shape produced by fabrication is retained, and furthermore the treatment can be applied at any desired temperature and pressure.

It has been proposed to use high energy radiation to produce a cross-linked polymer from a mixture of a bifunctional monomer with a polymer which contains at least one double bond per unpolymerised molecule. For example, it has been proposed to cross-link by radiation a mixture of styrene with an unsaturated polyester.

It is also known that new polymeric chains can be grafted to existing polymeric chains by irradiating mixtures of polymers and monomers to give thermoplastic bodies differing markedly in properties from those of the original polymer.

It is an aim of the present invention to produce, by irradiation, a polymer of enhanced physical and mechanical properties, in particular, infusibility and reduced solubility in the common solvents.

According to the invention, a cross-linking of a polymer is produced by subjecting a mixture of the polymer and a tetra-functional monomer to irradiation from high voltage electrons, X-rays, gamma rays or the like. The monomer may be imbibed into the body of the polymer, or it may simply be on the surface so that only the surface is affected in the manner according to the invention. The invention is applicable to polymeric materials which are fully saturated as well as to unsaturated polymers. Preferred polymeric materials comprise polymers of an ethylenically unsaturated compound, said polymers comprising chains of repeating units, each unit having the structure ($CH_2$—$CXY$) where X and Y are hydrogen or halogen atoms or organic radicals.

The effect of the radiation is believed to cause cross-linking of the polymer through the agency of the tetra-functional monomer to improve its properties without seriously altering its overall nature and characteristics.

This leads to a desirable change in the polymer such as reduced fusibility and reduced solubility which are unattainable by irradiation alone or which requires much higher levels of radiation in the absence of such a substance. This treatment can be applied at any convenient temperature and pressure to prefabricated solid articles as is known for plain irradiation. The products of this invention are characterised by improved thermal resistance or chemical resistance or both, by improved mechanical properties at both room and elevated temperature and other desirable properties. It is also possible through this invention to produce stable mixtures of polymers which cannot readily be made in any other way.

One application of our invention comprises a process for combining certain monomers, characterised by the presence of two polymerisable double bonds in the molecule, with polymers by mixing in some suitable manner and then irradiating the mixture with high energy particles such as high energy electrons or high energy electromagnetic radiations such as X-rays or gramma rays, to link the molecules in the mixture. This may take place with the polymer in its final fabricated state, so that the article may be fabricated from the parent polymer in its thermoplastic state and is subsequently converted into a form which is no longer thermoplastic.

It will be appreciated that the invention has at least two possible lines of development or application.

The first is the introduction of a suitable monomer or two or more monomers into a polymer with subsequent irradiation producing polymerisation with linking of the molecules in the mixture.

The second is the application of a suitable monomer to the surface of a polymer followed by irradiation to produce a sandwich material in which the surface layer has different properties from the inner layers or body of the material.

One simple method whereby the object of this invention can be achieved is to immerse the solid mass of the polymer in the liquid monomer and to irradiate the resulting swollen solid and then to dry off the residual uncombined monomer. In the course of polymerisation, the new polymer may be chemically linked to the parent polymer so as to cross-link the molecules of the parent polymer.

By the phrase "tetra-functional monomer" we mean any polymerisable monomer, the molecule of which has at least four potentially reactive sites, for example at least two potentially reactive double bonds, and we intend to include also those monomers having a higher functionality than four.

The invention is not limited to a mixture of single polymer with a single monomer. In fact, it is applicable and particularly efficacious as applied to mixtures of two or more monomers with a single polymer or with two or more polymers. The treatment of the polymer with the two or more monomers may be simultaneous or separate in suitable stages. The combination of a given monomer with a given polymer may be greatly facilitated in certain cases by the addition of a second monomer which is more active in swelling the given polymer and so serves to incorporate the given monomer, and which may or may not be tetra-functional.

A variation of the process of combining a polymer with two or more monomers is first to swell the polymer in one of the monomers, to dry superficially, and then to immerse in the second monomer, and subsequently to irradiate. In this way polymer chains are formed both internally and externally and a skin of polymer of one kind may be formed on the surface of a polymer of another kind to which it is chemically bound.

A typical polymer which can be cross-linked by the operation of the process of this invention is polyethylene. Polyethylene exhibits only limited swelling in monomers such as diallyl phthalate, ethylene dimethacrylate, acrylonitrile and acrylic acid, but it swells readily in vinylidene chloride. It is therefore desirable to mix vinylidene chloride with the required monomer so as to facilitate imbibition.

The advantage of using vinylidene chloride as the swelling agent rather than a non-monomeric swelling agent for polyethylene is that the radiation also polymerises the vinylidene chloride, whereas a non-monomeric swelling agent would have to be removed subsequently by drying. An alternative method for accomplishing incorporation of a relatively large amount of cross-linking monomer consists of intermittent irradiation with the partially irradiated polymer reswollen in the monomer between treatments. This intermittent technique can be applied equally well to mixtures of required tetra-functional monomers with vinylidene chloride. Chloroprene is an example of a tetra-functional monomer with a powerful swelling action on polyethylene and the use of this monomer alone or in conjunction with other monomers accords with the principles of this invention.

Another important polymer to which the process of this invention can be applied is polyvinyl chloride. This polymer is more readily swollen than polyethylene by required tetra-functional monomers, and admixture of such monomers with vinylidene chloride is not necessary. Nevertheless, the binary mixture of polyvinyl chloride and tetra-functional monomers frequently turns out to be difficult to form or handle and it is preferred in certain cases to admix another monomer which has good affinity for the polyvinyl chloride. Examples of such compatible monomers are diallyl phthalate and lauryl methacrylate.

The relative amounts of polymer and monomer or monomers may vary within wide limits. Generally, the amount of monomer used is not more than the polymer weight and as little as 0.5% of monomer, based on the weight of the polymer has some advantageous effect.

The action of the incident radiation in inducing cross-linking reactions with the aid of tetra-functional monomers is not confined to polyethylene and polyvinyl chloride and can act similarly on many other linear polymers including those polymers, such as polymethyl methacrylate, which, in the absence of the monomer, undergo degradation on exposure to radiation.

In carrying out the present process, any source of high energy ionising radiation can be used, but preferably radiation of energy greater than 100,000 electron volts is used, at doses in the range 0.1–50 megarads, 1–10 megarads generally being sufficient.

The above outlined principles of this invention are more fully clarified and illustrated by the following examples of its operation.

*Example 1*

This is an example of the cross-linking of polyethylene by radiation of this polymer in the presence of a tetra-functional monomer.

A sheet of a commercial grade of polyethylene known under the registered trademark "Alkathene HD," was immersed in a 6% solution of mixed divinyl benzenes in ethyl styrene for nine days at 60° C., during which time swelling had reached its maximum extent. The swollen sheet was superficially dried and then exposed at room temperature to the electron beam from a 2 mev. Van der Graaff electrostatic accelerator until the energy deposited was one megarad. The sheet was then dried at a temperature of 60° C. and a pressure of 1 mm. of mercury until the weight was constant. The increase in weight was found to be 9.6%. A portion of the sheet was then tested for insolubility by immersing in xylene at 110° C. for 48 hours when 33% of the material was found to resist solution and was deemed to represent insoluble material. By comparison, an unswollen sheet of Alkathene HD irradiated to the same level (1 megarad) was completely dissolved by the xylene at 110° C. in a few hours.

*Example 2*

This is an example of the production of sandwich material comprising a thermoplastic inner layer and a hard thermoset outer layer.

Perspex sheet, which is a commercial grade of polymethyl methacrylate, was immersed in ethylene dimethacrylate for 2 hours, during which time there was very little change in the appearance of the sheet. The sheet was then exposed to an electron beam, as described above, until the energy deposited was 10 megarads. On examination, the sheet was found to have acquired a hard infusible surface.

*Example 3*

This is an example of the use of a monomeric swelling agent to facilitate incorporation of a desired tetra-functional monomer.

A sheet of polyethylene (Alkathene Grade 2) was immersed in a 50% solution of ethylene dimethacrylate in vinylidene chloride for 48 hours at room temperature, then superficially dried and exposed to an electron beam as described above until the energy deposited was 10 megarads. The sheet was subsequently dried and found to have gained 9.8% in weight and to have become infusible. A control experiment in which the polyethylene was immersed in pure ethylene dimethacrylate led to only 3.0% increase in weight.

*Example 4*

This is an example of the use of a compatible monomer to facilitate handling of a mixture of the polymer with the required cross-linking agent and illustrates the conversion of a thermoplastic material to a rigid thermosetting material with very light radiation treatment.

One hundred parts of polyvinyl chloride was mixed with thirty parts of lauryl methacrylate, fifteen parts of ethylene dimethacrylate and 0.25 part of dibutyl tin-dilaurate in the cold, then sheeted out on a hot mill. The milled stock was then exposed to an electron beam as described above until the energy deposited was 5 megarads. The composition was found to have become rigid and infusible. The tensile strength of the composition after irradiation was 6,000 pounds per square inch, and its elastic modulus was 140,000 pounds per square inch. Before irradiation, the tensile strength of the composition was 2,050 pounds per square inch, and the elastic modulus was 3,700 pounds per square inch. On Soxhlet extraction of the irradiated composition with tetrahydrofuran, 67% remained insoluble. Prior to irradiation, the entire composition dissolved readily. Furthermore, a sample of rigid polyvinyl chloride irradiated to a level of 5 megarads also dissolved completely in boiling tetrahydrofuran.

*Example 5*

This is an example of the use of chloroprene as the tetra-functional monomer.

A sheet of polyethylene (Alkathene Grade 2) was immersed in a 50% solution of chloroprene in xylene for twelve days at room temperature, during which time it had reached its equilibrium swelling of 19.5%. It was then exposed to an electron beam as described above until the energy deposited was 4 megarads. The sheet was dried and found to have gained 3.7% in weight.

On extracting with xylene for 48 hours at 110° C., 37% was found to resist solution. The sheet was found to have at room temperature a tensile strength of 2,150 pounds per square inch, and an elongation of 560% compared with a tensile strength of 1,825 pounds per square inch, and an elongation of 570% for Alkathene Grade 2 irradiated to the same extent without the chloroprene treatment.

*Example 6*

This is an example of the production of stable mixtures of polymers. A composition containing 40 parts of cellulose acetate, 27 parts of polyacrylonitrile and 33 parts of diallyl phthalate was prepared by milling on heated twin rolls. The composition was then exposed to an electron beam, as described above, until the energy deposited was 25 megarads. The composition was then extracted with boiling methyl ethyl ketone when 82.3% was found to resist solution. In comparison, the unirradiated composition was only 38% insoluble in boiling methyl ethyl ketone and disintegrated during the extraction. The cellulose acetate must therefore have been converted into an insoluble material as a result of this treatment.

*Example 7*

This is an example of the simultaneous polymerisation of two monomers, one in the body of the material and one on the surface. A sheet of polyethylene (Alkathene Grade 2) was swollen in vinylidene chloride for 16 hours and, without drying, placed in a shallow dish containing ethylene dimethacrylate. The assembly was then irradiated with an electron beam as described above until the energy deposited was 20 megarads. The Alkathene was found to have acquired a hard surface which was non-detachable.

A similar experiment, in which the vinylidene chloride was not used also led to the production of a hard surface film, but this could be readily detached.

We claim:

1. A process for improving the properties of polyvinyl chloride comprising the steps of mixing the polyvinyl chloride with less than its own weight of lauryl methacrylate and less than its own weight of ethylene dimethacrylate, forming the resulting mixture into a sheet, and then exposing said sheet to the action of high energy ionising radiation of energy greater than 100,000 electron volts to a dosage of between 0.1 and 10 megarads.

2. A process for producing a rigid sheet of thermosetting material comprising the steps of mixing with 100 parts of polyvinyl chloride about 30 parts of lauryl methacrylate and about 15 parts of ethylene dimethacrylate, forming the resulting mixture into a thermoplastic sheet, and then exposing said sheet to the action of electron radiation of a dosage of about 1 to 10 megarads.

References Cited

UNITED STATES PATENTS

| | | | |
|---|---|---|---|
| 2,155,590 | 4/1939 | Garvey | 260—884 |
| 2,666,025 | 1/1954 | Nozacki | 204—158 |
| 2,670,483 | 3/1954 | Brophy | 204—159.17 |
| 2,505,068 | 4/1950 | Sachs et al. | 204—158 |
| 2,921,006 | 1/1960 | Schmitz et al. | 204—159.17 |
| 3,012,001 | 12/1961 | Smith | 204—159.17 |
| 3,115,418 | 12/1963 | Magat et al. | 204—159.17 |
| 3,125,546 | 3/1964 | Pinner et al. | 204—159.17 |

OTHER REFERENCES

Ballantine et al.: B.N.L. Report No. 414, pp. 1–14, October 1956, 204-154GP.

B.N.L. Report No. 375, p. 26, April 1956, 204-154GP.

MURRAY TILLMAN, *Primary Examiner.*

GEORGE F. LESMES, *Examiner.*

R. B. TURER, N. F. OBLON, J. ZIEGLER, W. L. BASCOMB *Assistant Examiners.*